(12) United States Patent
Fodor et al.

(10) Patent No.: US 8,804,532 B2
(45) Date of Patent: Aug. 12, 2014

(54) METHOD AND ARRANGEMENT FOR ADAPTING TO VARIATIONS IN AN AVAILABLE BANDWIDTH TO A LOCAL NETWORK

(75) Inventors: Gabor Fodor, Hässelby (SE); Alessio Terzani, Rome (IT)

(73) Assignee: Unwired Planet, LLC, Reno, NV (US)

( * ) Notice: Subject to any disclaimer, the term of this patent is extended or adjusted under 35 U.S.C. 154(b) by 1800 days.

(21) Appl. No.: 10/582,899

(22) PCT Filed: Dec. 15, 2003

(86) PCT No.: PCT/SE03/01951
§ 371 (c)(1),
(2), (4) Date: May 7, 2007

(87) PCT Pub. No.: WO2005/057866
PCT Pub. Date: Jun. 23, 2005

(65) Prior Publication Data
US 2007/0286213 A1    Dec. 13, 2007

(51) Int. Cl.
*H04J 3/16*    (2006.01)
*H04L 12/56*    (2006.01)

(52) U.S. Cl.
CPC .................................. *H04L 47/762* (2013.01)
USPC ......................................... 370/241; 370/468

(58) Field of Classification Search
USPC ...................... 414/497, 541, 540, 684.3, 921; 296/146.4
See application file for complete search history.

(56) References Cited

U.S. PATENT DOCUMENTS

| | | | |
|---|---|---|---|
| 5,570,355 A * | 10/1996 | Dail et al. ..................... | 370/352 |
| 5,771,459 A | 6/1998 | Demery et al. | |
| 6,246,688 B1 | 6/2001 | Angwin et al. | |
| 7,388,838 B2 * | 6/2008 | Abraham et al. ............. | 370/235 |
| 2001/0038640 A1 * | 11/2001 | McKinnon et al. ........... | 370/468 |
| 2003/0045231 A1 | 3/2003 | Chapelle et al. | |
| 2003/0117298 A1 | 6/2003 | Tokunaga et al. | |
| 2003/0171852 A1 | 9/2003 | Vollmer et al. | |
| 2003/0198184 A1 | 10/2003 | Huang et al. | |
| 2007/0207020 A1 * | 9/2007 | Samuels et al. ............... | 414/537 |

FOREIGN PATENT DOCUMENTS

| | | |
|---|---|---|
| CN | 1295772 | 5/2001 |
| CN | 1433617 | 7/2003 |
| EP | 1 278 351 | 1/2003 |
| JP | 2003-273879 | 10/2003 |
| WO | WO 00/63806 | 10/2000 |
| WO | WO 01/26332 | 4/2001 |

(Continued)

OTHER PUBLICATIONS

W. Lu, Fourth-Generation Mobile Initiatives and Technologies, IEEE Communications Magazine, vol. 40, No. 3, Mar. 2002, p. 104.

(Continued)

*Primary Examiner* — Kevin C Harper
(74) *Attorney, Agent, or Firm* — Nixon & Vanderhye PC

(57) ABSTRACT

In a vehicular network having a plurality of connected user equipment, experiencing a change in an available bandwidth a method for adapting to the change is performed comprising the steps of collecting information about the users and the bearers, detecting a change in bandwidth available for the local network, identifying user equipment in the local network to be affected by said detected change, notifying the identified user equipment of an adaptation of the bandwidth for the identified user equipment, and finally adapting the bandwidth of each identified user equipment.

42 Claims, 6 Drawing Sheets

(56) References Cited

FOREIGN PATENT DOCUMENTS

| | | |
|---|---|---|
| WO | WO 01/26338 | 4/2001 |
| WO | WO 02/39304 | 5/2002 |
| WO | WO 02/47404 | 6/2002 |

OTHER PUBLICATIONS

R. Berezdivin et al., Next Generation Wireless Communications Concepts and technologies, IEEE Communications Magazine, vol. 40, No. 3, Mar. 2002, pp. 108-116.
E. Gustafsson et al., Always Best Connected, IEEE Wireless Communications, Feb. 2003, pp. 49-55.
A. Jamalipour et al., Fourth Generation Wireless Networks and Interconnecting Standards, IEEE Personal Communications Magazine, Oct. 2001, pp. 8-9.
H. Yumiba et al., IP-Based IMT Network Platform, IEEE Personal Communications Magazine, Oct. 2001, pp. 18-23.
G. Fodor et al., Providing QoS in Always Best Connected Networks, IEEE Communications Magazine, vol. 41, No. 7, Jul. 2003, pp. 154-163.
Network Mobility WG Charter, http://www.ietf.org/html.charters/nemocharter.html.
S. Dixit et al., Resource Management and QoS in Third-Generation Wireless Networks, IEEE Communications Magazine, vol. 39, No. 2, Mar. 2002, pp. 125-133.
Spectrun Efficient Uni- and Multicast Services over Dynamic Multi-Radio Networks in Vehicular Environments IST-2001-35125, http://www.ist-overdrive.org.
S. Chemiakina et al., QoS Enhancement for Adaptive Services over WCDMA, to appear in the Journal of Selected Areas in Communications, 2003, pp. 1-26.
The Session Initiation Protocol (SIP), IETF RFC 3261, http://www.ietf org/rfc/rfc3261.txt.
The Session Description Protocol (SDP), IETF draft, http://ietf.org/internet-drafts/draft-ietf-mmusic-sdp-new-15.txt.
Real Time Streaming Protocol (RTSP), IETF RFC 2326, http://www.ietf.org/rfc/rfc2326.txt.
Real Time Protocol (RTP), IETF RFC 1889, http://www.ietf.org/rfc/rfc/1889.txt.
Next Steps in Signaling (NSIS), http://www.ietforg/html.charters/nsis-charter.html.
Summary of Japanese official action, Jul. 10, 2009, corresponding Japanese Application No. 2005-511712.
Takeo et al., "The Effect of the Arrangement of WFQ Schedulers on Application-level QoS", Technical Report of IEICE, NS2003-189, Vol, No. 443, Nov. 14, 2003, pp. 101-106. English Abstract.
International Search Report for PCT/SE03/01951 dated Jul. 2, 2004.
3GPP TS 25.331, "Radio Resource Control (RRC); Protocol Specification", Release 5, V5.5.0, Jun. 2003), pp. 1-996.
M.A. Ronai et al., "Mobility Issues in OverDRIVE Mobile Networks", Proceedings of the IST Mobile & Wireless Communications Summit, 2003, 5 pages.

\* cited by examiner

METHOD AND ARRANGEMENT FOR ADAPTING TO VARIATIONS IN AN AVAILABLE BANDWIDTH TO A LOCAL NETWORK

This application is the US national phase of international application PCT/SE2003/001951 filed 15 Dec. 2003, which designated the U.S., the entire contents of which are hereby incorporated by reference.

TECHNICAL FIELD

The present invention relates to communications networks in general, and specifically to adaptation to variations in available bandwidth for a local network.

BACKGROUND

Recently there has been a growing interest in the so called beyond $3^{rd}$ generation (B3G) wireless systems. There seems to be a common understanding that these systems will be composed of heterogeneous technologies both on the terminal side (mobile phones, laptops, PDA's, etc.) and the network side (fixed and radio access technologies, transmission systems, etc.) [1], [2]. From the end-user's perspective, these systems promise to deliver ubiquitous connectivity [3] and a wide range of high-quality services [4], [5].

Ubiquitous service provision involves scenarios where connectivity is provided to passengers traveling on some vehicle, such as a bus, train, boat or an aircraft [3], [6]. In fact, such local moving or vehicular network scenarios have recently been identified as an important standardization area by the Internet Engineering Task Force [7].

In a moving network scenario, in which the vehicle uses a wireless (satellite, cellular or WLAN) link to be connected to a fixed access point (base station); the available bandwidth between the local network in the vehicle and some stationary access point or access router can vary as the vehicle moves between access points. In general, these access points do not have to belong to the same radio access technology (RAT). For instance, when a train arrives at a station, it may provide connectivity through a large-capacity wireless local area network (WLAN). When leaving the station it may switch to cellular access such as a 3G or UMTS network. Also, while within the same RAT, available bandwidth may fluctuate due to mobility or changes in the radio conditions (fading, shadowing, etc). Due to the variations in the available bandwidth for the vehicular network, individual users, who share the total available bandwidth, will experience a variation in the bandwidth available for each user.

In a multi-access scenario with vehicular networks, all traffic coming from the users connected to a wireless gateway can be aggregated in a few shared bearers having high bandwidth. Each such bearer carries a specific type of traffic, i.e. data traffic of similar type from several users is multiplexed into the same aggregated or shared bearer.

When the vehicle enters a cell or a new access with different available bandwidth, an adaptation occurs, e.g. one or more shared radio channels (i.e. bearers) between the vehicular network and an available access router in another network are torn down or preferably their respective bandwidth is modified up or down to a suitable level. In a straight forward procedure, one or more users whose traffic prior to the bandwidth change is multiplexed into the shared bearer are dropped.

SUMMARY

A general problem with prior art vehicular networks is that a reduction in available bandwidth leads to arbitrary and non-predictable interruptions of user traffic. In view of this problem it is an object of the present invention to provide a method and an arrangement for improved adaptation to variations in available bandwidth for a local network.

A further object of the invention is to enable maintaining connectivity with at least some minimum quality of service for as many connected users as possible, while at the same time adapting the bandwidth for the individual users to match the change in total available bandwidth of the local network.

Another further object of the present invention is to provide a method for identifying users to be affected by a change in available bandwidth of the shared bearers and for notifying the identified users of the change.

These objects are achieved by methods and devices in accordance with the attached claims.

Briefly, information concerning all aggregated bearers and their associated QoS values is collected, stored and updated continuously. Also, information about each connected user and their on-going sessions is collected. The user information preferably comprises QoS parameters, Internet Protocol (IP) information and information concerning utilized bearers. When a change is detected in an aggregated bearer the method according to the invention utilizes the information concerning the bearer and the users utilizing the bearer in order to identify users suitable to have their bit rate adapted. This identification is preferably performed by comparing the current bit rate for a user with a minimum or maximum bit rate for the user, and based on that comparison deciding if the user should be targeted for an adaptation of its allocated bandwidth. Consequently, the identified users are notified about the required adaptation. Finally the adaptation of the allocated bandwidth for the identified users is performed.

In order to perform said method according to the invention an arrangement for enabling said adaptation is provided. The arrangement comprises means for detecting the change in bandwidth available for the network, means for identifying users, means for notifying users and finally means for adapting the allocated bandwidth for each identified user. Further, in order to enable the detection and the identification the arrangement preferably comprises two databases for collecting and storing information concerning the users and the bearers in the network.

The advantages with the present invention is that it enables maintaining at least a minimum QoS for as many users as possible, while at the same time adapting to a change in the bandwidth available for the local network. Additionally, due to the notifying step the affected users are made aware of a change and can choose how to adapt to the required change.

BRIEF DESCRIPTION OF THE DRAWINGS

The invention, together with further objects and advantages thereof, may best be understood by making reference to the following description taken together with the accompanying drawings, in which.

DETAILED DESCRIPTION

In order to fully understand the present invention a further background is provided below, where in addition to the specifics of the present invention the context of the described problem is further discussed.

The present invention is applicable to local networks in general, but will be described with reference to a vehicular wireless network since the problem with bandwidth variations is more pronounced in a vehicular scenario.

The method according to the invention will in the following enabling embodiments be described as implemented as part of the functionality of a wireless gateway in a wireless vehicular network. It is however implied that corresponding functionalities can reside in other parts of a mobile router, the wireless vehicular network or in some other part of an associated communications network.

The only assumption in the implementations of the embodiments is the availability of a Layer-2 (L2) notification message from the access router to the wireless gateway, which normally exists.

Since the present invention mostly relates to the identification and notification of user equipment to be affected and required to adapt in the vehicular network, all other functionalities are assumed to be performed according to common knowledge of anyone skilled in the art and are thus not further explained.

Figure 1:
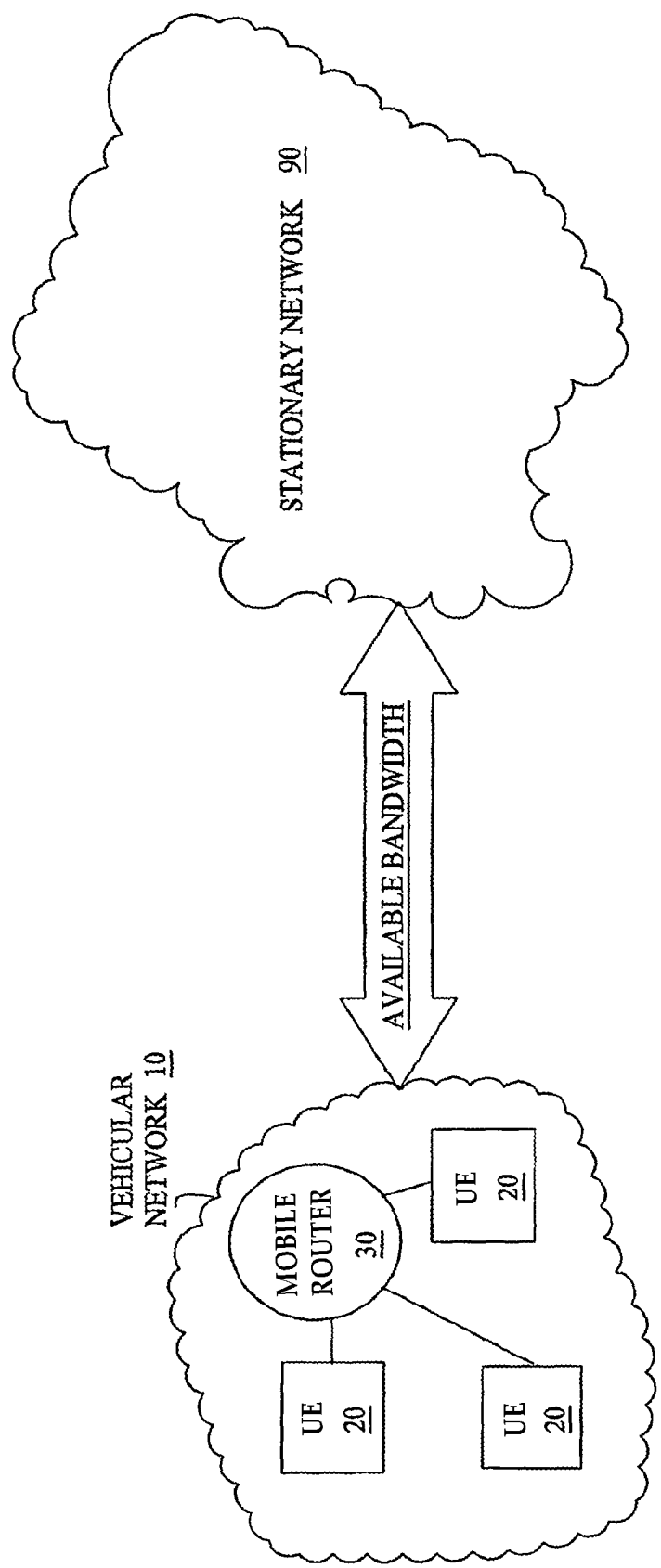
FIG. 1 is a schematic block diagram of a vehicular network and a stationary network.

In FIG. 1 a schematic block diagram of a vehicular network 10 connected to some stationary network 90 (e.g. UMTS, WLAN) is illustrated. The vehicular network 10 comprises a mobile router 30 having a plurality of connected user equipment 20. Each user equipment 20 has an associated individual bearer or channel with an allocated or individual bandwidth providing connectivity to the mobile router 30. The mobile router 30 has a few large aggregated bearers providing connectivity to the stationary network 90; those bearers together provide the available bandwidth between the networks 10, 90.

The mobile router 30 is a layer-3 (L3) entity that is a fundamental component in the vehicular network scenario and is part of the vehicular network 10. The mobile router 30 is similar to a standard IP router in the sense that it provides an L3 routing and packet forwarding service to/from users or user equipment in the vehicular network 10. It is however capable of changing its point of attachment to an IP backbone and hiding IP mobility for the users in the vehicle [7]. In practice, the mobile router 30 is often extended to incorporate higher layer functionalities such as web caching, various signaling functionalities (e.g. SIP/SDP) and other proxy functionalities (e.g. TCP) [9]. These functionalities are however not part of the basic moving network scenario. Therefore, technical solutions to provide quality of service (QoS) and adaptation support should not rely on the assumption that higher layer-5/7 (L5/7) entities are present or co-located with the mobile router.

Since the mobile router 30 has to provide L3 routing and packet forwarding service, it preferably contains support for some wireless access technology. Therefore the mobile router 30 is assumed to also provide some wireless gateway functionality that allows set up, maintenance and tearing down of wireless bearers between the mobile router 30 in the vehicle and an access router of the landline backbone network 90. However, it is implied that the wireless gateway functionality can be provided elsewhere in the vehicular network or outside the vehicular network.

Each user equipment 20, in a known manner, contains the applications (supporting voice-over-IP a streaming client, web browser, etc.) that the user uses to access various services. This can be a laptop with a wireless interface or a personal digital assistant (PDA) equipped with a Bluetooth capability. The user equipment 20 contains an operating system (OS) and several signaling modules (not shown), including a Session Initiation/Description Protocol (SIP/SDP) [11, 12], Real Time Signaling Protocol (RTSP) [13], RTCP [14] and Next Steps in Signaling (NSIS) [15] Protocol and possibly other. However, these are well known entities, and are therefore not further described.

Each user equipment 20 also can contain several layer-2 (L2) drivers and interfaces, such as Ethernet, infrared, Bluetooth, WLAN, etc. These L2 interfaces allow the user equipment to get connected to the wireless gateway functionality.

Figure 2:
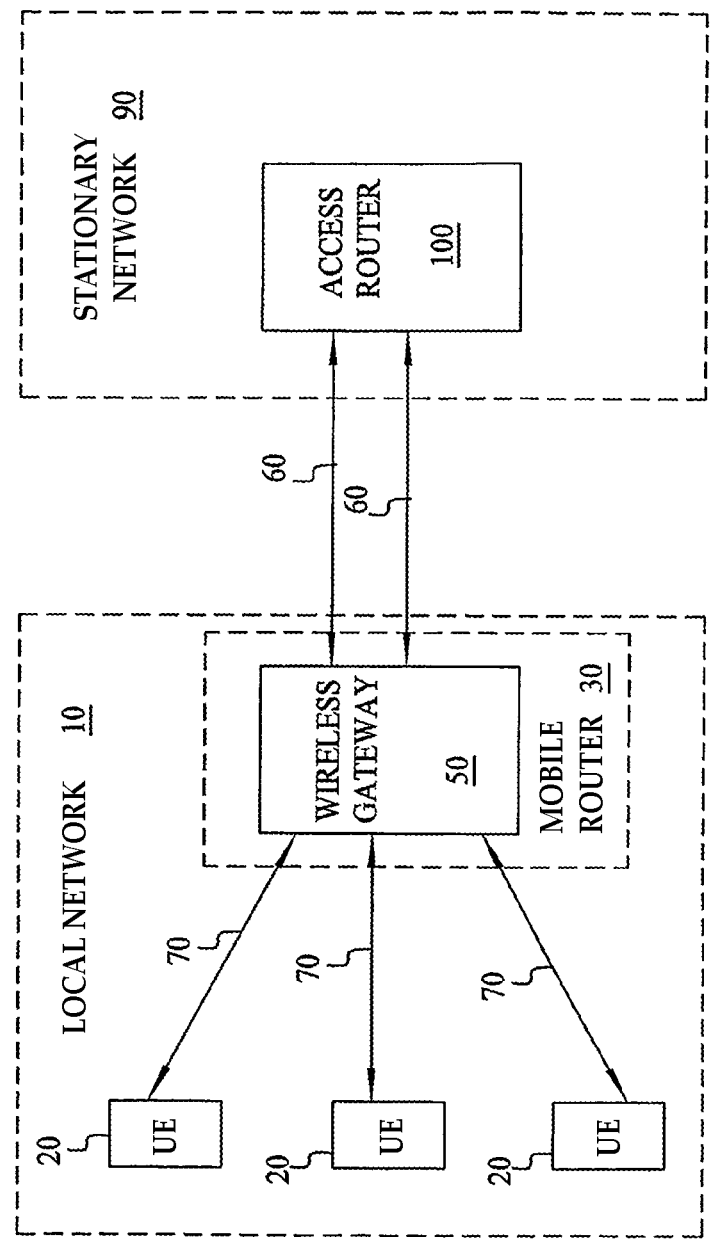
FIG. 2 is a block diagram of communicating networks.

In FIG. 2 another block diagram of communicating networks 10, 90 is shown. Here the local or vehicular network 10 comprises node or a wireless gateway 50, which can be part of the mobile router 30 but as mentioned before located elsewhere in the vehicular network or in the communication system, with a plurality of connected user equipment 20. Each user equipment 20 has an associated bearer 70 with an allocated bandwidth to the wireless gateway 50 and the wireless gateway 50 has a plurality of associated shared or aggregated bearers 60 providing the available bandwidth to an access router 100 of a stationary network 90.

It is important to note that individual users or user equipment 20 connected to the vehicular network 10 may be completely unaware of the access technology that is used to provide the wireless bearer service between the mobile router 30 and the landline access router 100 (via some wireless access point).

For instance, passengers in a vehicle may use Ethernet or WLAN technology aboard to be connected to some "on board entertainment server" (that may contain the wireless gateway) while the server may use a cellular or satellite link to connect to some access point (and further to an access router of a public/private IP network such as the Internet or an enterprise network). As seen from the IP layer, the packet delivery service between the wireless gateway and the access router that represents the first IP hop is called the wireless bearer service. This bearer service involves all the necessary control and user plane functionalities that are required to provide a reliable and QoS aware packet delivery service between the mobile router 30 and the access router. For instance, in UMTS the bearer service involves the operation of the packet data protocol (PDP) context and the user plane operations (e.g. scheduling) of the various user traffic (conversational, streaming, interactive, background and signaling) [8].

The wireless gateway 90, in a known manner utilizes a few wireless connections to the access point (and a few bearers 60 toward the access router), each with associated quality of service (QoS) characteristics. As already mentioned, passenger or user data traffic belonging to similar quality classes and requesting similar service quality can be multiplexed into aggregated or shared bearers. This solution allows the separation of, for instance, voice-over-IP users from Internet browsing users, and/or the separation of "business class" users from "tourist class" users.

As an example of a vehicular scenario experiencing the abovementioned problem, consider passengers traveling on a train, where the train hosts a mobile router. Assume that the train enters a congested UMTS Terrestrial Radio Access Network (UTRAN) cell, i.e. a cell with a reduced available bandwidth. UTRAN contains WCDMA congestion control algorithms that allows it not to tear down the radio channel but to decrease or adapt the bandwidth of the shared radio channel or bearer to a suitable value (e.g. from 2 Mb/s to 128 kb/s). In that situation some users, using the shared (and now adapted) bearer, have to adapt their service to a suitable rate (down-switch) such that the sum of the bit-rates available to the individual IP flows does not exceed this reduced value (in the example 128 kbps). If the service continues at the old higher rate, the data buffer in the network (e.g. in the RCN) will go in overflow, producing loss of packets. There is also the reverse mechanism, if the wireless gateway hands-off to an unloaded cell from a bit-rate constrained cell or enters a new access with higher bandwidth, more bandwidth is reserved for the shared channel and subsequently some users can be adapted (up-switch).

Figure 3:
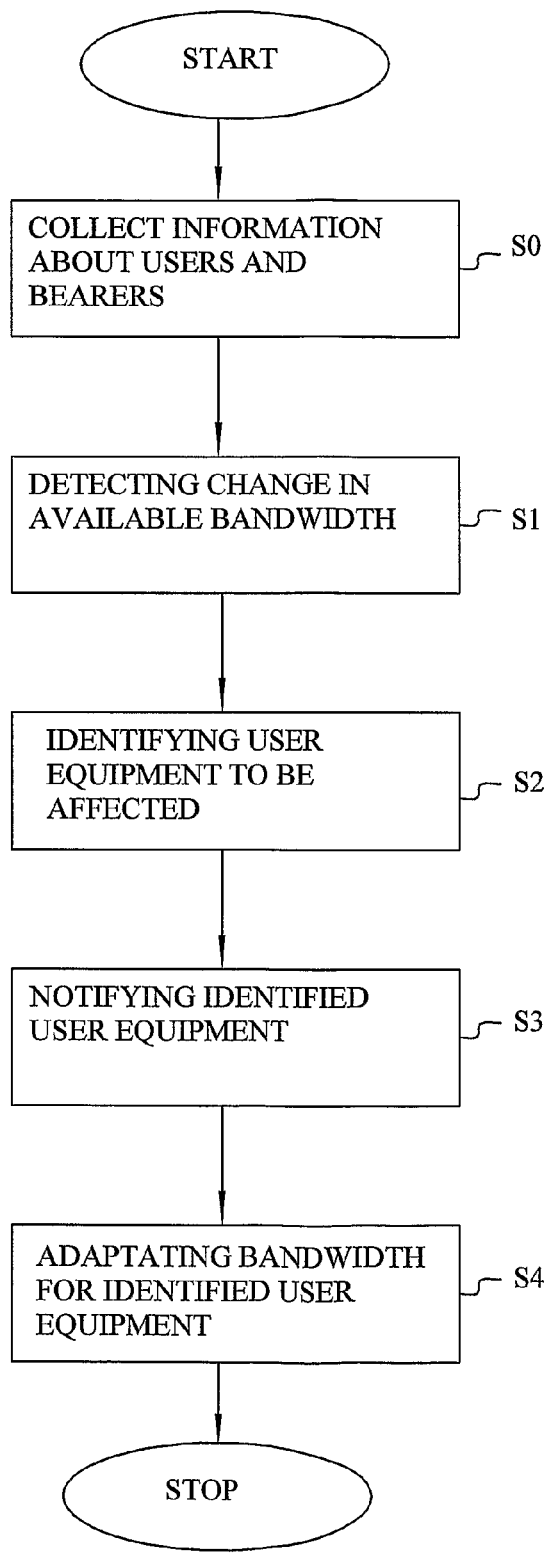
FIG. 3 is a flow diagram of main steps of an embodiment of a method according to the invention.

A detailed description of an embodiment of the method according to the invention for adapting to said variations in available bandwidth to the vehicular or local network 10 will be performed with reference to FIG. 3.

During start up of the vehicular network the bearers or bearer service (both in the vehicular network and to the stationary network) are set up according to known methods.

In a first step S0 according to the invention, information regarding each bearer is collected and stored in a table or a bearer data base. The information can concern various aspects of information, but at least a bearer label (e.g. A, B, C, etc.) identifying each bearer and an associated available aggregated or shared L2 quality of service (QoS). The bearer data base is then continuously updated each time a QoS value changes due to congestion or decongestion, or when the train with the vehicular network moves to a new cell within one access or changes to a new access, or alternatively when a new bearer is set up or old ones are torn down.

Also in said first step S0, during the user session set up phase, each user or user equipment exchanges information with its peer entity using IP or higher-level protocols (e.g. NSIS to reserve resources, SIP for video conference session set up or RTSP for streaming session set up). This information contains QoS parameters (e.g. bit rate, delay, etc) and IP parameters (e.g. IP destination and source address and port) characterizing the data flow.

Since the wireless gateway can intercept the above mentioned messages, each time user equipment connects to the vehicular network i.e. the mobile router or the node or wireless gateway, collects the information regarding QoS parameters, internet protocol (IP) information and utilized bearer and stores it in a table or user data base. QoS parameters include preferably at least a current bit rate, and the IP information includes at least the IP address of each user equipment.

Preferably the collected information in the user data base includes:
  IP information (5-tuple): Protocol type, source and destination IP addresses, and source/destination ports of the user and its peer entity, for uplink and downlink directions.
  QoS information. QoS parameters such as bandwidth, delay, jitter, etc. requested for data and other information related to the user (e.g. type of contract, i.e. gold/silver/bronze)
  The QoS parameters preferably also include a minimum bit rate and a maximum bit rate. The minimum bit rate is a bit rate below which the user equipment cannot receive a requested QoS.

The user data base is updated continuously and/or at least each time user equipment connects and/or disconnects from the vehicular network. Updates are also possible or preferably necessary when user equipment switches from one type of data traffic to another, thereby possibly switching to another aggregated bearer.

Moreover, as the wireless gateway knows which L2 bearer carries the user traffic, it can associate each user to the bearer label (e.g. A is the bearer for streaming, B for WWW traffic, C for real time traffic, etc.). This parameter (i.e. the 5-tuple associated with L2 bearer label) is used to perform the binding between the adapted bearer and the user to be affected.

In a next step S1 according to an embodiment of the method according to the invention the vehicular network or the mobile router or some other optional entity detects a change in available bandwidth (preferably by monitoring the bearer data base) and has to decide how to adapt the connections of the connected user equipment within the network.

In the following step S2 according to the embodiment in FIG. 3, the wireless gateway or the mobile router, based on the collected information in the bearer data base, identifies the bearer with the adapted bandwidth. From the field "Bearer" in the user data base, the wireless gateway finds out all the users using that bearer. Since one or more of the users have to be switched, the selection is performed by looking at the "QoS information" field in the user data base. A simple selection method consists of selecting the users consuming a greater bandwidth, but it is also possible to take into account more complex methods considering, for instance, the type of contract or class (i.e. gold/silver/bronze user) for each user.

Assuming that a down-switch is required, an exemplary identification method for step S2 according to the embodiment in FIG. 3 will be described with reference to FIG. 4.

Initially the first user equipment in the user data base is selected. The difference between the current bit rate and the minimum bit rate for the selected user equipment is calculated. If the difference is equal to zero the user equipment is already at its minimum bit rate, and is left unadapted. But, if the difference is larger than zero, thus indicating that the user equipment is not at its minimum bit rate, the user equipment is targeted as a candidate for a down-switch. Preferably, the user equipment is targeted to be down-switched to its minimum bit rate, but it is likewise possible to down-switch with a smaller amount.

Subsequently the targeted down-switch is compared to the required adaptation. If it is still necessary to down-switch additional user equipment, the next user equipment in the user data base is selected and the comparison between the current and the minimum bit rate is repeated.

This process is repeated until the required adaptation is achieved, i.e. the sum (or accumulated) of the entire individual targeted down-switches or adaptations is at least equal to the change or adaptation of the available bandwidth. However, if and when all user equipment are at their respective minimum bit rate but the required adaptation is not achieved, then some user equipment have to be terminated or disconnected. This can be performed according to some random selection or some predetermined selection criteria i.e. minimum bit rate, type of traffic, type of contract etc.

When the required adaptation is achieved and a number of user equipment are targeted for down-switch, the user equipment are in step S3 with reference to FIG. 3 notified of the required down-switch. Optionally, depending on the type of traffic, also the peer entity of the user equipment can be notified of the required adaptation.

As the wireless gateway can be a NSIS, RTSP and SIP proxy, it can send directly the switch message: for instance in case of streaming the wireless gateway can send the RTSP PAUSE-PLAY messages to the streaming server, whilst in case of real time service it can send the NSIS message (containing new QoS parameters) to the user and/or to the remote side. The wireless gateway knows the IP addresses and ports for these messages because it can find them in the "IP information" field contained in the user database.

Finally, in step S4, the individual bandwidth of each identified user equipment is adapted to their new bit rate according to the targeted down-switch.

Consequently, the user data base is again updated. A corresponding method according to the invention can be applied when more bandwidth is made available, thereby enabling user equipment to up-switch. In this case the entire change in available bandwidth does not have to be adapted to.

One additional step for the case of multiple bearers is necessary. In that case a first step in a selection method according to the invention comprises identifying all user equipment utilizing one adapted bearer, and subsequently identifying user equipment to be adapted, according to the above description.

Figure 4:
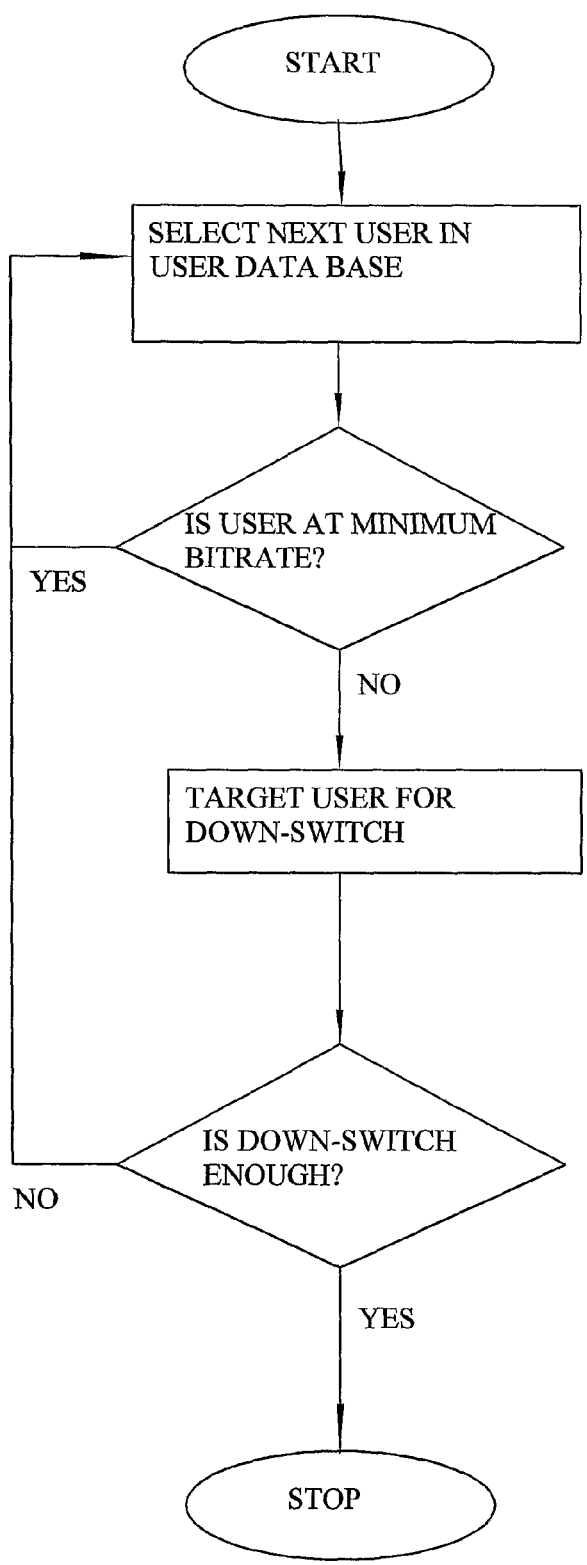
FIG. 4 is a flow diagram of part of another embodiment of the method according to the invention.
Figure 5:
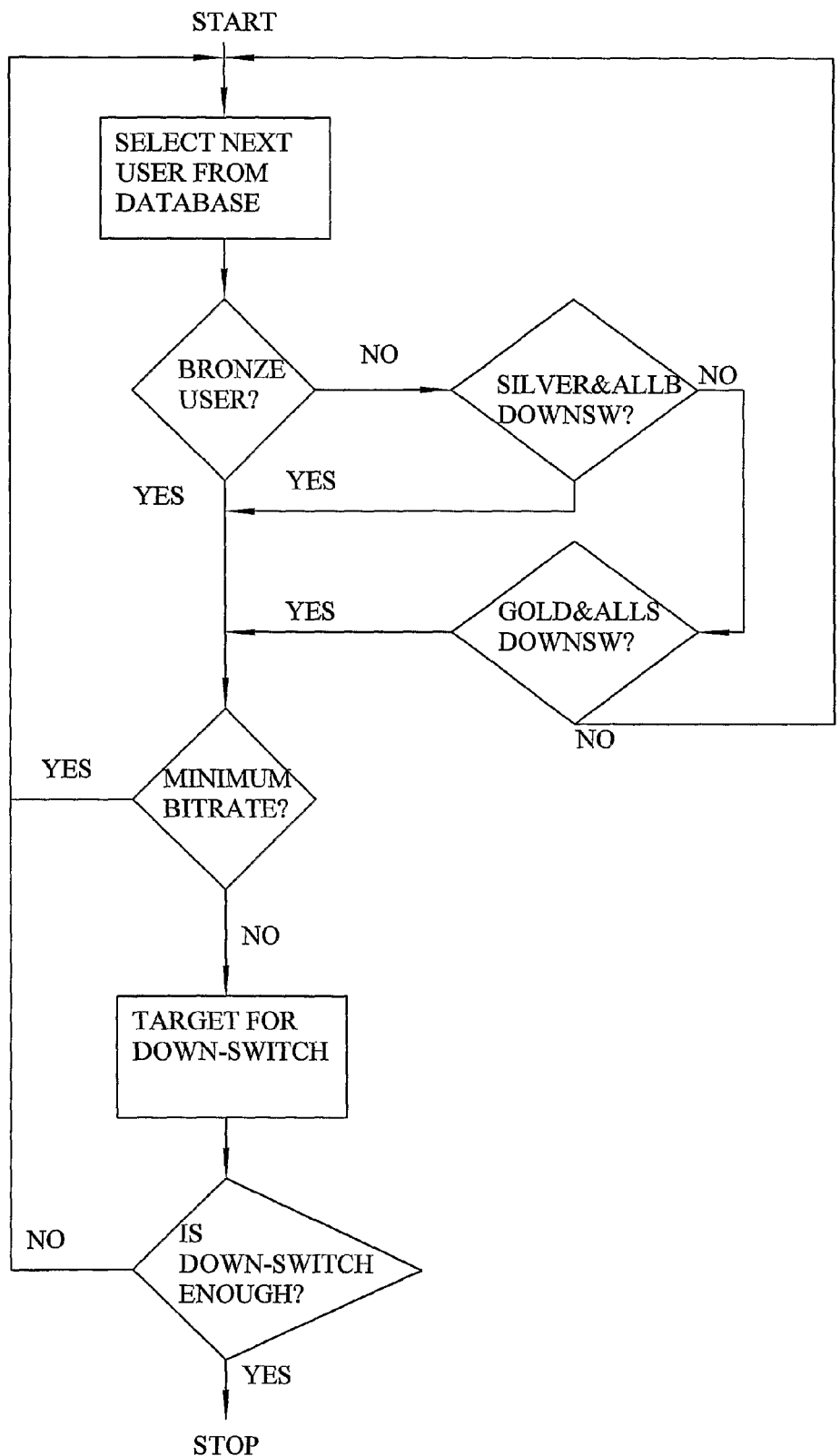
FIG. 5 is a flow diagram of a special case of the embodiment in FIG. 4, having users associated with a service class according to the invention.

One additional aspect of the embodiment in FIG. 4 according to the invention is illustrated in FIG. 5.

This embodiment of part of the method according to the invention is basically equal to the embodiment of a method according to the invention in FIG. 4, with the addition of using the contract or class type i.e. bronze, silver, and gold as selection criteria. In that case all user equipment with a lower contract or class has to be targeted for a down-switch before user equipment with a higher contract can be targeted. That is: all bronze have to be down-switched first, and then all silver and last all gold. This is an unfair but simple algorithm. It is however possible to formulate a selection method that is more fair but also more complex.

By utilizing the method according to the invention, it is possible to maintain at least a minimum quality of service for the majority of user equipment in a vehicular network. Also, the method enables user equipment to adapt to variations in available bandwidth and minimize the risk of loss of data due to termination of user equipment.

Figure 6:
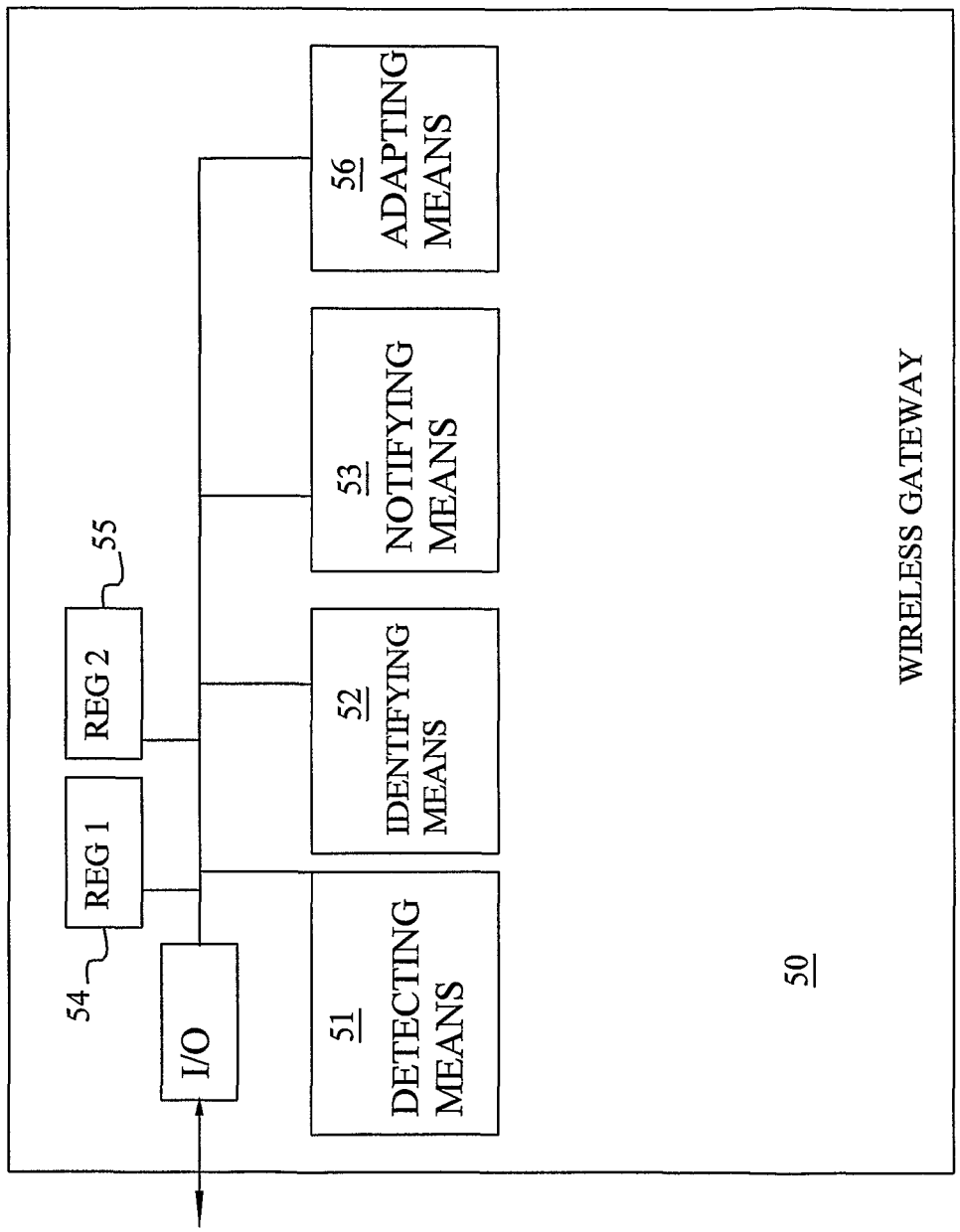
FIG. 6 is a schematic block diagram of an embodiment of a wireless gateway according to the invention.

FIG. 6 is a schematic block diagram of an embodiment of a wireless gateway 50 according to the invention, comprising an input/output unit, detecting means 51 adapted for detecting a change in an available bandwidth i.e. a change in an available bandwidth of a bearer 60, to the wireless gateway 50, identifying means 52 adapted for identifying user equipment 20 to be affected by the detected change, notifying means 53 adapted for notifying the identified user equipment of the required adaptation, a bearer data base 54 and a user data base 55. Also, the wireless gateway 50 comprises adapting means for performing the adaptation of the individual bandwidths for the identified user equipment 20.

In addition to the above mentioned, the wireless gateway 50 provides various L2 interfaces towards user equipment 20 and a set of interfaces towards the land-line base-stations and/or access points. The wireless gateway 50 also has the control logic to set up, modify and tear down wireless bearer services 60, such as UMTS, CDMA2000, GPRS, EDGE and possibly others.

Also, the wireless gateway 50 can comprise a translation function entity that manages user flows and maps these onto appropriate wireless bearers 60. For instance, based on L3/5 protocol and QoS information, it maps, for instance, streaming user traffic into wireless streaming bearers, or voice (over IP) traffic into conversational bearers. For the special case, where there is a one-to-one correspondence between the user IP flows and the UMTS bearers, the details of such a mapping function are described in [6].

The bearer data base 54 comprises information regarding each of the aggregated bearers 60, such as a bearer label and an available aggregated L2 QoS value. This bearer data base 54 is updated whenever there is a change in the available bandwidth i.e. changes in the QoS value, due to congestion or decongestion or new access entering, for a bearer 60.

The user data base 55 comprise QoS information, IP information and utilized bearer for each of the user equipment 20 that is connected to the vehicular network 10.

The merit of the invention is that it requires no changes to high level protocols (RTSP, NSIS, etc) or to L2 protocols in the user equipment, access router or in the access networks.

Moreover, the usage of high-level protocols to transport the switch information makes this invention independent of the underlying access technology and so it can be applied in general cases when different kinds of wireless accesses are used.

It will be understood by those skilled in the art that various modifications and changes may be made to the present invention without departure from the scope thereof, which is defined by the appended claims.

REFERENCES

[1] W. W. Lu, "Fourth Generation Mobile Initiatives and Technologies", *IEEE Communications Magazine*, Vol. 40, No. 3, p. 104, March 2002.
[2] R. Berezdivin, R. Breinig and R. Topp, "Next Generation Wireless Communications Concepts and Technologies", *IEEE Communications Magazine*, Vol. 40, No. 3, pp. 108-116, March 2002.
[3] E. Gustafsson and A. Jonsson, "Always Best Connected", *IEEE Wireless Communications*, pp. 49-55, February 2003.
[4] A. Jamalipour and S. Tekinay, "Fourth Generation Wireless Networks and Interconnecting Standards", *IEEE Personal Communications Magazine*, pp. 8-9, October 2001.
[5] H. Yumiba, K. Imai and M. Yabusaki, "IP-Based IMT Network Platform", *IEEE Personal Communications Magazine*, pp. 18-23, October 2001.
[6] G. Fodor, A. Eriksson, A. Tuoriniemi, "Providing QoS in Always Best Connected Networks", *IEEE Communications Magazine*, Vol. 41, No. 7, pp. 154-163, July 2003.
[7] Network Mobility WG Charter, http://www.ietf.org/html.charters/nemocharter.html
[8] S. Dixit, Y. Gou and Z. Antoniou, "Resource Management and QoS in Third Generation Wireless Networks", *IEEE Communications Magazine*, Vol. 39, No. 2, pp. 125-133, March 2002.
[9] http://www.ist-overdrive.org
[10] S. Chemiakina, L. D. Antonio, F. Forti, R. LAlli, J. Peterson and A. Terzani, "QoS Enhancement for Adaptive Services over WCDMA", to appear in the *Journal of Selected Areas in Communications*, 2003
[11] The Session Initiation Protocol (SIP), IETF RFC 3261, http://www.ietf.org/rfc/rfc3261.txt
[12] The Session Description Protocol (SDP), IETF draft, http://www.ietf.org/internet-drafts/draft-ietf-mmusic-sdp-new-15.txt
[13] Real Time Streaming Protocol (RTSP), IETF RFC 2326, http://www.ietf.org/rfc/rfc2326.txt
[14] Real Time Protocol (RTP), IETF RFC 1889, http://www.ietf.org/rfc/rfc1889.txt
[15] Next Steps in Signaling (NSIS), http://www.ietf.org/html.charters/nsis-charter.html

The invention claimed is:

1. A method for adapting to variations in an available bandwidth to a local network in a communications system, said local network having a plurality of connected user equipment, said method comprising the steps of:

detecting a change in bandwidth available between the local network and the communications system, identifying user equipment in the local network to be affected by said detected change, based at least partly on quality of service parameters for said identified user equipment, notifying said identified user equipment of an adaptation of an allocated amount of the available bandwidth for said identified user equipment, and adapting the allocated amount of the available bandwidth of said identified user equipment.

2. A method according to claim 1, wherein the local network is a vehicular network.

3. A method according to claim 1, wherein the quality of service parameters comprise at least a current bit rate.

4. A method according to any of the claims 1, wherein said detection step comprises the further step of detecting a change in the available bandwidth for at least one of a plurality of bearers, said bearers together providing the available bandwidth of said local network.

5. A method according to claim 4, wherein each of said plurality of bearers is an aggregated bearer, whereby similar data traffic from different ones of said plurality of user equipment are multiplexed into the aggregated bearer.

6. A method according to claims 4, wherein said step of detecting said change in the available bandwidth for the at least one of the plurality of bearers in turn comprises a step of collecting information about each of said plurality of bearers and a quality of service value for each of said plurality of bearers and comparing current information to previous information in a bearer data base.

7. A method according to claim 3, wherein said identifying step comprises comparing said current bit rate to another quality of service parameter for said identified user equipment.

8. A method according to claim 1, wherein further step of collecting information comprising at least said quality of service parameters for each user equipment and storing said information in a user data base, whereby said identifying step comprises the step of comparing different quality of service parameters for said user equipment in said user data base.

9. A method according to claim 8, wherein the step of collecting information further comprises collecting information concerning a respective utilized bearer for each user equipment.

10. A method according to claim 7, wherein said another quality of service parameter is one of a maximum bit rate and a minimum bit rate.

11. A method according to claim 10, wherein said step of identifying comprises the step of calculating a difference between the current bit rate and the minimum bit rate for each user equipment and selecting user equipment with a difference larger than zero for down-switching, thereby maintaining at least a minimum connection for each user equipment as long as possible.

12. A method according to claim 8, further comprising updating the information in said user data base in response to user equipment connecting to or disconnecting from the local network.

13. A method according to claim 6, further comprising updating the information in said bearer data base in response to changes in the quality of service values and/or in response to said local network changing to a new access.

14. A method according to claim 8, wherein said collecting step further comprises collecting information concerning source and destination IP addresses, maximum and minimum bit rate, and utilized bearer for each user equipment and respective peer entities, and storing said information in the user data base.

15. A method according to claims 8, wherein said collecting step further comprises collecting information concerning source and destination ports, and protocols of each user equipment and its peer entities, and storing said information in the user data base.

16. A method according to claim 8, wherein said step of identifying said user equipment includes the steps of:

selecting a first user equipment in the user data base, if a down-switch is required, calculating a difference between the current bit rate and the minimum bit rate for said first user equipment, targeting said first user equipment for a down-switch to its minimum bit rate if said difference is larger than zero, selecting next user equipment in the user data base if said difference is equal to zero, thereby indicating that said user equipment is already at its minimum bit rate, if an up-switch is possible, calculating the difference between a current bit rate and the maximum bit rate for said first user equipment, targeting said first user equipment for an up-switch to its maximum bit rate if said difference is larger than zero, selecting next user equipment in the user data base if the difference is equal to zero, thereby indicating that said user equipment is already at its maximum bit rate, in the case of a down-switch, repeating above steps until the sum of all down-switches is at least equal to the change in available bandwidth, in the case of an up-switch, repeating above steps until the sum of all up-switches is at most equal to the change in the available bandwidth.

17. A method according to claim 16, further comprising identifying all user equipment in the data base using said at least one bearer.

18. A method according to claim 16, further comprising updating said user data base in response to said up- or down-switches.

19. A method according to claim 16, further comprising further identifying user equipment based on a respective contract.

20. A method according to claim 18, further comprising terminating one user equipment if all user equipment are already at their minimum bit rate and a down-switch is required.

21. A gateway node for a local network that communicates with a communications system, said local network having a plurality of user equipment connected to a mobile router, said gateway node comprising:

means for detecting a change in an available bandwidth between the local network and the communications system;

means for identifying user equipment in the local network to be affected by said detected change based at least partly on quality of service parameters for said identified user equipment, means for notifying said identified user equipment of an adaptation of an allocated amount of the available bandwidth for said identified user equipment, and means for adapting the allocated amount of the available bandwidth of said identified user equipment.

22. A gateway node according to claim 21, wherein the local network is a vehicular network.

23. A gateway node according to claim 21, wherein the node is a wireless gateway.

24. A gateway node according to claim 21, wherein said means for detecting is adapted for detecting a change in the available bandwidth of at least one of a plurality of bearers, said bearers together providing the available bandwidth between the local network and the communications system.

25. A gateway node according to claim 21, further comprising a bearer data base having information about each bearer and/or a quality of service value for each bearer.

26. A gateway node according to claim 21, wherein said means for identifying comprises a user data base, said user data base comprising at least a current bit rate and a maximum bit rate and/or a minimum bit rate for said user equipment.

27. A gateway node according to claim 26, wherein said user data base includes quality of service parameters, internet protocol information, and utilized bearer for each user equipment.

28. A local network for communicating with a communication system, said local network comprising:
   a plurality of user equipment connected to a mobile router,
   means for detecting a change in available bandwidth between the local network and the communications system,
   means for identifying user equipment in the local network to be affected by said detected change based at least partly on quality of service parameters for said user equipment,
   means for notifying said identified user equipment of an adaptation of an allocated amount of the available bandwidth for said identified user equipment, and
   means for adapting the allocated amount of the available bandwidth of said identified user equipment.

29. A local network according to claim 28, wherein said local network is a vehicular network.

30. A local network according to claim 28, wherein said detecting means are adapted for detecting a change in the available bandwidth of at least one of a plurality of bearers, said bearers together providing the available bandwidth between the local network and the communications system.

31. A local network according to claim 28, further comprising a bearer data base having information about each bearer and/or a quality of service value for each bearer.

32. A local network according to claim 28, further comprising a user data base having the current bit rate and a maximum bit rate and/or a minimum bit rate for said user equipment.

33. A local network according to claim 32, wherein said user data base includes quality of service parameters, internet protocol information, and utilized bearer for each user equipment.

34. A gateway node for use in a local network in communications with a communications system, the local network having a plurality of user equipment connected to a mobile router, the node being configured to:
   detect a change in an available bandwidth between the local network and the communications system;
   identify user equipment in the local network to be affected by the detected change based at least partly on quality of service parameters for the identified user equipment,
   notify the identified user equipment of an adaptation of an allocated amount of the available bandwidth for the identified user equipment, and
   adapt the allocated amount of the available bandwidth of the identified user equipment.

35. A gateway node according to claim 34, wherein the local network is a vehicular network.

36. A gateway node according to claim 34, wherein the node is a wireless gateway.

37. A gateway node according to claim 34, wherein the gateway node is configured to detect a change in the available bandwidth of at least one of a plurality of bearers, the plurality of bearers together providing the available bandwidth between the local network and the communications system.

38. A gateway node according to claim 34, further comprising a bearer data base having information about each bearer and/or a quality of service value for each bearer.

39. A gateway node according to claim 34, further comprising a user data base having a current bit rate and a maximum bit rate and/or a minimum bit rate for each of the plurality of user equipment.

40. A gateway node according to claim 39, wherein the user data base includes quality of service parameters, internet protocol information, and utilized bearer information for each of the plurality of user equipment.

41. A local network for communication with a communication system, the local network comprising:
   a plurality of user equipment connected to a mobile router,
   a local network node configured to:
      detect a change in available bandwidth between the local network and the communication system,
      identify user equipment in the local network to be affected by the detected change based at least partly on quality of service parameters for the identified user equipment,
      notify the identified user equipment of an adaptation of the allocated bandwidth for the identified user equipment, and
      adapt the allocated amount of the available bandwidth of the identified user equipment.

42. A local network according to claim 41, wherein the local network is a vehicular network.

* * * * *

UNITED STATES PATENT AND TRADEMARK OFFICE
CERTIFICATE OF CORRECTION

| | |
|---|---|
| PATENT NO. | : 8,804,532 B2 |
| APPLICATION NO. | : 10/582899 |
| DATED | : August 12, 2014 |
| INVENTOR(S) | : Fodor et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2517 days.

Signed and Sealed this
Sixth Day of October, 2015

Michelle K. Lee
*Director of the United States Patent and Trademark Office*